United States Patent
Zoso et al.

(10) Patent No.: US 7,286,070 B2
(45) Date of Patent: Oct. 23, 2007

(54) RF CARRIER GENERATOR AND METHOD THEREOF

(75) Inventors: Luciano Zoso, Chandler, AZ (US); Allan P. Chin, Phoenix, AZ (US); David P. Lester, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/284,566

(22) Filed: Nov. 21, 2005

(65) Prior Publication Data

US 2007/0115158 A1 May 24, 2007

(51) Int. Cl.
*H03M 3/00* (2006.01)
(52) U.S. Cl. .................. 341/143; 341/144; 341/147
(58) Field of Classification Search .......... 341/143, 341/118, 120, 155, 200; 375/136, 142, 150
See application file for complete search history.

(56) References Cited

U.S. PATENT DOCUMENTS

| | | | | |
|---|---|---|---|---|
| 5,594,443 A | * | 1/1997 | Lam | 341/144 |
| 6,356,224 B1 | * | 3/2002 | Wohlfarth | 341/147 |
| 6,366,603 B1 | * | 4/2002 | Uchida et al. | 375/136 |
| 2001/0026233 A1 | * | 10/2001 | Hellberg et al. | 341/120 |
| 2002/0027886 A1 | * | 3/2002 | Fischer et al. | 370/255 |
| 2002/0191690 A1 | * | 12/2002 | Pendergrass et al. | 375/239 |
| 2006/0077090 A1 | * | 4/2006 | Schimper | 341/155 |

\* cited by examiner

*Primary Examiner*—Linh Nguyen
(74) *Attorney, Agent, or Firm*—Michael J. Balconi-Lamica

(57) ABSTRACT

An RF carrier generator comprises a circuit for sequentially counting as a function of a randomized offset and time interval, and a memory coupled to the sequential counting circuit. The memory stores samples of a desired Sigma-Delta modulator sequence bit stream. Responsive to an output of the sequential counting circuit, the memory sequentially outputs a single-bit output bit stream of a series of partial sequences of the desired Sigma-Delta modulator sequence bit stream. A method is also disclosed.

18 Claims, 6 Drawing Sheets

RF CARRIER GENERATOR AND METHOD THEREOF

CROSS-REFERENCE TO CO-PENDING APPLICATIONS

This application is related to co-pending patent applications, Ser. No. 11/060,993 entitled "BTSC Encoding Method With Digital FM Modulation" to Zoso et al. and Ser. No. 11/061,155 entitled "BTSC Encoder With Digital FM Modulator Feature" to Zoso et al., both filed on Feb. 18, 2005, assigned to the assignee of the present disclosures and incorporated herein by reference.

BACKGROUND

The present disclosures relate to audio/video electronics and communications, and more particularly, to an RF carrier generator and method for RF carrier generation for use with the audio/video electronics and communications.

Traditional analog carrier generators require precision phase-lock loops (PLLs) and voltage controlled oscillators (VCOs) to synthesize carriers with the frequency accuracy and stability necessary to comply with TV standards. PLL loop filters must be carefully designed to minimize jitter. Furthermore, in the event of process changes, analog blocks often require redesign.

In another approach, Digital Direct Synthesis (DDS) techniques can be applied to audio/video RF carrier generation; however, a corresponding performance and maximum synthesizable frequency of such a generator are limited by a digital-to-analog converter (DAC) performance. Additionally, DACs require a considerable area of an IC chip and need redesign when ported to other integrated circuit technologies. Furthermore, more hardware efficient bandpass Sigma-Delta DACs are unsuitable for use in replacing traditional DACs, because the order would be too high (e.g. greater than twenty (>20)) and a speed of the corresponding digital circuitry would not be adequate to generate RF carriers. The high order would be necessary to generate a noise notch wide enough to allow a realizable analog reconstruction filter.

Another technique to generate analog high-precision sine waves involves using a Sigma-Delta oscillator. Sigma-Delta oscillators are digital resonators containing a 1-bit Sigma-Delta DAC in a loop, and thus can directly generate a 1-bit signal. The frequency is selected by changing the gain of a feed-back loop. All blocks are digital except for a Sigma-Delta output buffer. However for the application of audio/video RF carriers, high-order bandpass Sigma-Delta modulators are required. Since the same considerations made above for the bandpass Sigma-Delta modulators for DDS apply to this case too, Sigma-Delta oscillators are not practical for generating RF carriers.

Even though a Digital Direct Synthesis generator with bandpass Sigma-Delta modulator or a Sigma-Delta oscillator cannot run in real time to generate RF carriers, the circuit can be simulated on a computer and the outputs can be stored into a memory. Another technique consists in using generators with such Sigma-Delta samples stored in a memory. However, such generators target built-in self tests (BIST) for ICs and do not meet performance requirements for most applications other than the built-in self tests.

FIG. 1 is a schematic block diagram view of a carrier generator 10 using a pre-recorded Sigma-Delta modulator sequence or bit stream. RF carrier generator 10 includes a digital Sigma-Delta sequence generator 12 and an analog filter 14. Digital Sigma-Delta sequence generator receives a clock signal at input 16 and includes a counter 18 and memory or look-up table (LUT) 20. Responsive to an output from counter 18, the memory or LUT 20 outputs, sequentially, a bit stream of single bits on output 22 of the digital Sigma-Delta generator 12. Responsive to an input (corresponding to the output 22 of the digital Sigma-Delta generator 12), analog filter 14 provides an RF carrier signal on output 24.

With the carrier generator 10 of FIG. 1, a desired Sigma-Delta sequence bit stream is first generated (i.e., by some means such as Digital Direct Synthesis generators or Sigma-Delta oscillators not running in real time or by computer simulations) and then stored as a sequence in a circular memory or lookup table. Generating the bit stream then comprises reading out the entire sequence and repeating the reading out over and over. In addition, the carrier generator 10 of FIG. 1 is completely digital with the exception of the output buffer or analog filter 14. Furthermore, the carrier generator 10 does not require any precision components, only a stable and accurate clock source. As stated above, such generators as shown in FIG. 1 are as described in the literature; however, they are for built-in self test (BIST) applications for mixed-signal integrated circuits (ICs). Furthermore, such generators, with practical sizes of look-up tables, do not meet performance requirements for most applications other than the BIST applications. In fact, by increasing the look-up table size the performance could be met. However, (i) the hardware complexity could become too high and/or (ii) the look-up table could no longer be read at the appropriate speed needed to generate the RF carrier.

Accordingly, there is a need for an improved method and apparatus for overcoming the problems in the art as discussed above.

BRIEF DESCRIPTION OF THE DRAWINGS

The present invention is illustrated by way of example and not limited by the accompanying figures, in which like references indicate similar elements, and in which.

Figure 1:
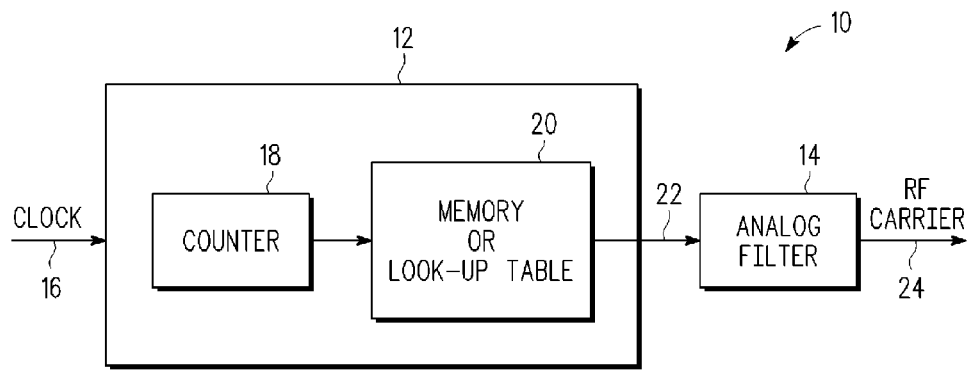
FIG. 1 is a schematic block diagram view of a carrier generator using a pre-recorded Sigma-Delta modulator sequence or bit stream as known in the art.

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

According to one embodiment of the present disclosure, an analog RF carrier generator comprises a Sigma-Delta carrier generator that utilizes a look-up table and a bit stream randomizer. The look-up table contains pre-computed samples of a Sigma-Delta modulator with a sinusoidal input. A counter generates an address and a bit stream randomizer randomizes the output, as will be discussed further herein. The bit stream randomizer allows signal generation that more closely resembles the output of a hardware implementation of the Sigma-Delta modulator, assuming that the digital circuitry could operate or run at real-time speeds. A bandpass Sigma-Delta modulator model needs also to be (i) designed for each carrier and (ii) used to produce a bit stream for each carrier.

In one embodiment, pre-computed Sigma-Delta samples are stored in one or multiple look-up tables. The address is computed by adding the counter output to an offset produced by a bit stream randomizer and changed at random intervals. Whenever the randomizer generates a new offset, a number of samples equivalent to the offset are skipped before resuming the sequential reading. In this way, sequences of variable length and starting point can be output. The randomizer performs two tasks: (i) it generates, in combination with the counter, an offset which determines the starting point of a new partial sequence, and (ii) it generates the random interval which determines the duration of each partial sequence. Table lengths, offsets and time intervals are each configured to contain an integer number of carrier periods.

In one embodiment, the bit stream randomizer 42 comprises a V.32 voiceband data modem scrambler or random number generator 420 (such as described in ITU-T V.32 Recommendation) or similar scrambler used in data transmission systems. The bit stream randomizer 42 further comprises a sequence length counter 421, a comparator 422, and a multiplier 423. While such an implementation allows for taking full advantage of the randomizer and for achieving a maximum increase in performance, the implementation increases a hardware complexity of the RF carrier generator.

In another embodiment, a method for RF carrier generation comprises storing sequences of Sigma-Delta samples in a number of look-up tables, wherein the look-up tables are of the same size for a given RF carrier generator implementation. In addition, the table length is selected such that it can contain an integer number of carrier periods. Subsequent to populating the look-up tables with sequences of Sigma-Delta samples, the contents of each table are output sequentially. However, the order with which the look-up tables are selected is random, wherein the order is determined by the bit stream randomizer. A next look-up table is selected only when all the samples of a previous one have been output. The bit stream randomizer, as discussed in the previous paragraph, is used to randomize the bit stream output of the generator. In one embodiment, an offset produced by the randomizer is used as a control signal to drive a multiplexer for selecting a desired look-up table of the look-up tables.

According to another embodiment, an external analog bandpass filter filters the carrier generator output by rejecting the out-of-band noise for each carrier frequency. The maximum carrier frequency which can be generated is limited only by the speed with which the look-up tables can be read. In addition, the carrier generator is totally digital except for the output buffer. The carrier generator does not require a classic analog circuit with a PLL and VCO to generate the carrier. However, the carrier generator requires an accurate and stable frequency reference. Furthermore, with the use of the bit stream randomizer, the carrier generator of the embodiments of the present disclosure is also more cost effective than prior art carrier generators.

In yet another embodiment, the carrier generator can be implemented in a BTSC encoder combined with a digital FM modulator. In this embodiment, a few external components are needed to add FM modulated composite audio to composite video and to perform an AM modulation to generate channel 3 (Ch3)/channel 4 (Ch4) signals, which eliminates the need for a separate RF modulator chip.

Figure 2:
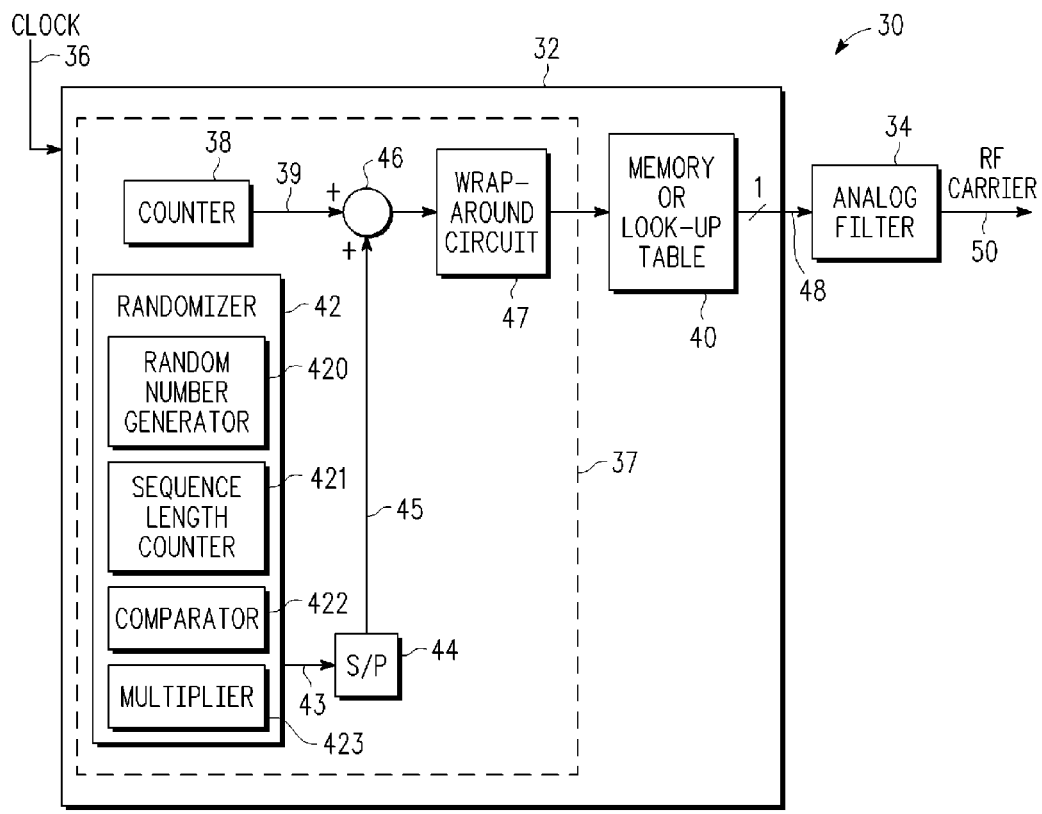
FIG. 2 is a schematic block diagram view of a carrier generator using a pre-recorded Sigma-Delta modulator sequence or bit stream and a randomizer according to an embodiment of the present disclosure.

Referring now to FIG. 2, the figure is a schematic block diagram view of a carrier generator 30 using a pre-recorded Sigma-Delta modulator sequence or bit stream and a randomizer, according to an embodiment of the present disclosure. RF carrier generator 30 includes a digital Sigma-Delta sequence generator 32 and an analog filter 34. Digital Sigma-Delta sequence generator (i.e., RF carrier generator) 32 receives a clock signal at input 36 and includes a means for sequentially counting as a function of a randomized offset, generally indicated by reference numeral 37. Generator 32 further includes a counter 38 which generates the memory addresses and one or more memory or look-up table (LUT) 40. In this embodiment, counter 38 generates memory addresses as discussed further herein. Digital Sigma-Delta sequence generator 32 further includes a randomizer 42 with single bit output, a serial-to-parallel (S/P) converter unit 44 which generates a multi-bit output, and a summation junction 46. Responsive to clock 36, counter 38 outputs a count that is incremented by one at every clock cycle and wraps around when the memory size is reached. Responsive to a summation of an output from counter 38 in conjunction with an S/P output from converter 44, via summation junction 46, the memory or LUT 40 outputs a bit stream of single bits on output 48 of the digital Sigma-Delta generator 32. A suitable wrap-around circuit 47 prevents the memory addresses from going outside the memory range. That is, the wrap-around circuit 47 comprises any suitable circuit implementation for performing a modulo operation, based on the size of the memory, on the output of summing junction 46. Moreover, responsive to an output of the sequential counting means 37, the memory 40 sequentially outputs a single-bit output bit stream 48 of a series of partial sequences of the desired Sigma-Delta modulator sequence bit stream. Responsive to an input (corresponding to the output 48 of the digital Sigma-Delta generator 32), analog filter 34 provides an RF carrier signal on output 50.

With the carrier generator 30 of FIG. 2, a desired Sigma-Delta sequence bit stream is first generated (i.e., by some suitable mechanism such as Digital Direct Synthesis generators or Sigma-Delta oscillators not running in real time or computer simulations) and then stored as a sequence in a memory or lookup table. The entire sequence is no longer read over and over, from beginning to end, as in the prior art generator. The bit stream of the carrier generator 30 of FIG. 2 comprises a series of partial sequences whose starting points and lengths depend on the output of the bit stream randomizer 42 and S/P converter 44, on signal lines 43 and 45, respectively. The memory address is obtained by adding the counter output 39 to the offset on signal line 45 produced by the S/P converter 44. The wrap-around circuit 47 prevents the memory address from going outside the memory range. A new partial sequence begins when the S/P block 44 outputs a new offset. The partial sequence is read sequentially, one bit at a time, as long as the offset is constant. Whenever a new offset is produced, a number of memory locations, and therefore samples, equivalent to the corresponding offset is skipped, thus starting a new partial sequence. In the embodiment of FIG. 2, the randomizer performs two tasks: (i) it generates with S/P block 44 a multi-bit offset which, when added to the counter output 34, determines the starting point of a new partial sequence, and (ii) it generates a random time interval which determines the partial sequence duration. In one embodiment, the randomizer 42 for producing the time intervals can comprise a sequence length counter 421, a comparator 422, and a multiplier 423. The sequence length counter 421 is cleared at the beginning of each new partial sequence and incremented by one whenever a new sample is read from the memory. The multiplier 423 multiplies (i) an integer multiple of the minimum length of a partial sequence (to be discussed further wherein) times (ii) an integer number derived by combining a number of bits of the offset. The product represents the length of the partial sequence which is being generated, wherein the maximum product cannot exceed the memory size. The product is continuously compared with the sequence length counter. When the sequence length counter output is equal to the product minus one, the counter is no longer incremented, but it is cleared, and a new offset is generated. By multiplying an integer multiple of the minimum length of a partial sequence with some bits of the offset, a random interval, equivalent to the length of a new partial sequence, is generated. The partial sequence lengths contain an integer number of carrier periods, as will be discussed further herein. In addition, the carrier generator 30 of FIG. 2 is a completely digital implementation with the exception of the output buffer or analog filter 34. Furthermore, the carrier generator 30 does not require any precision components, only a stable and accurate clock source for the clock on signal line 36. In one embodiment, the bit stream randomizer 42 comprises a randomizer that can directly generate a multi-bit offset.

Figure 3:
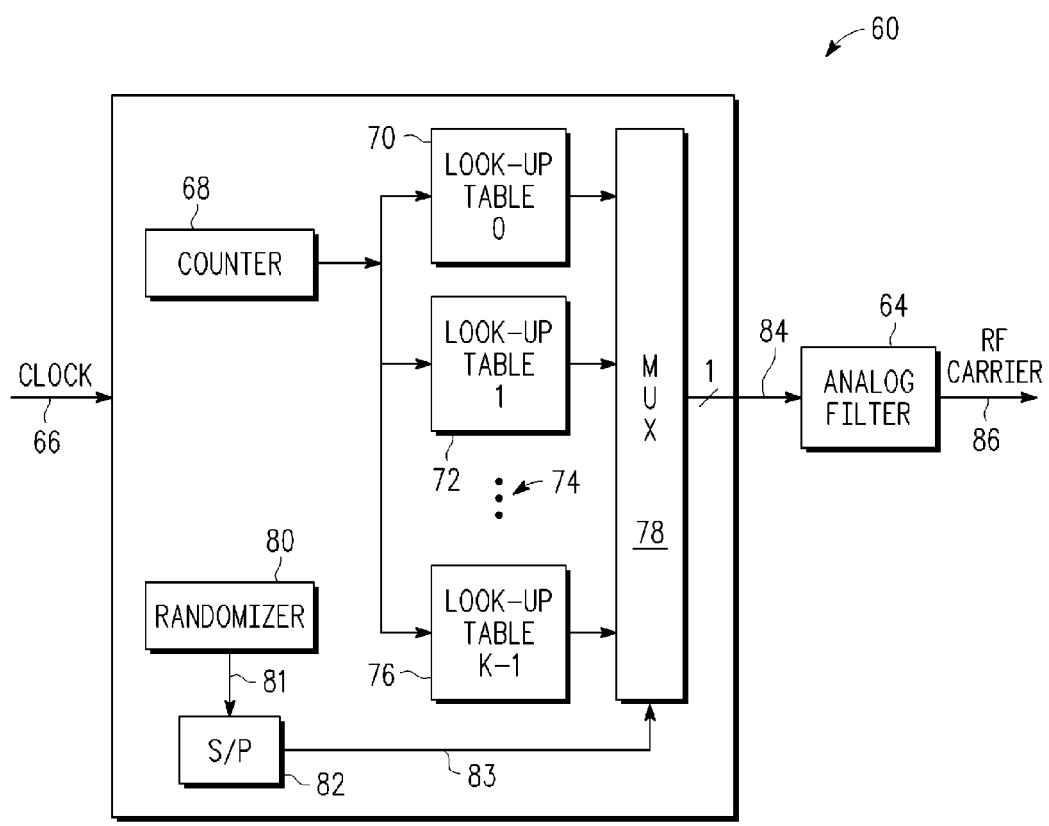
FIG. 3 is a schematic block diagram view of a carrier generator using a pre-recorded Sigma-Delta modulator sequence or bit stream and a randomizer according to another embodiment of the present disclosure.

FIG. 3 is a schematic block diagram view of a carrier generator 60 using a pre-recorded Sigma-Delta modulator sequence or bit stream and a randomizer, according to another embodiment of the present disclosure. RF carrier generator 60 includes a digital Sigma-Delta sequence generator 62 and an analog filter 64. Digital Sigma-Delta sequence generator 62 receives a clock signal at input 66 and includes a counter 68 which generates memory addresses as discussed further herein. Generator 62 further includes a number K of look-up tables (LUTs) or memories, from 0 to (K−1), as indicated by reference numerals 70, 72, 74, and 76, and where K is an integer. Reference numeral 74 points to a series of dots " . . . " that represent LUTs or memories occurring between the LUT 72 and LUT 76. Digital Sigma-Delta sequence generator 62 further includes a randomizer 80 with single bit output 81, an S/P converter 82 which produces a multi-bit control signal output 83, and a multiplexer 78. Responsive to clock 66, counter 68 outputs a count that is incremented by one at every clock cycle and wraps around when the memory size is reached. Responsive to the S/P converter output 83, the multiplexer 78 multiplexes onto single bit signal line 84 the bit stream produced by one of the LUTs or memories 70-76. Responsive to an input (corresponding to the output 84 of the digital Sigma-Delta generator 62), analog filter 64 provides a filtered RF carrier signal on output 86.

With the carrier generator 60 of FIG. 3, a desired Sigma-Delta sequence bit stream is first generated (i.e., by some suitable mechanism such as Digital Direct Synthesis generators or Sigma-Delta oscillators not running in real time or computer simulations) and then split into K partial sequences, wherein K is an integer number, each of which is stored as a sequence in a memory or lookup table. In operation, generating the bit stream with carrier generator 60 then comprises reading entirely the partial sequences stored in each memory. The contents of each memory are read sequentially, but the order with which the memories are selected is determined by the randomizer 80. In addition, the carrier generator 60 of FIG. 3 is completely digital with the exception of the output buffer or analog filter 64. Furthermore, the carrier generator 60 does not require any precision components, only a stable and accurate clock source for the clock on signal line 66.

With respect to determining a sequence and partial sequence length, some considerations must be made on the behavior and characteristics of Sigma-Delta modulators. Based on a linearized model, a Sigma-Delta modulator output Y(z) can be represented in the z-domain as:

$$Y(z)=STF(z)X(z)+NTF(z)Q(z) \quad \text{(Equation 1)}$$

where X(z), Q(z), STF(z) and NTF(z) are respectively the input, the quantization noise produced by the quantizer, the signal transfer function, and the noise transfer function. In all Sigma-Delta modulator configurations, the STF(z) has either a unity value or its value can be approximated with one at least in the signal passband. Accordingly, Equation 1 can be rewritten as:

$$Y(z)=X(z)+NTF(z)Q(z) \quad \text{(Equation 2)}$$

This means that the Sigma-Delta modulator output is equivalent to the input corrupted by the quantization noise shaped by the noise transfer function NTF(z).

In the case of an RF carrier, the input is a sinewave. In order to correctly reproduce the sinewave signal, the relationship between the carrier frequency ($f_c$), the sampling frequency ($f_s$) and the sequence length (N) is given by:

$$f_c = f_s M/N \quad \text{(Equation 3)}$$

where M is the number of integer periods of $f_c$ in the sequence of length N.

In view of the above, once the carrier frequency ($f_c$) and the sampling frequency ($f_s$) are selected, the sequence length (N) cannot arbitrarily be chosen. First of all, the sequence must contain an integer number of carrier periods. In fact, to generate a high-quality signal, full periods must be captured and reproduced periodically. With this criterion, we can find several values for N which satisfies a given signal integrity. For small values of N, if we take the fast fourier transform (FFT) of the repeated sequences of a Sigma-Delta modulator output, we can see that the signal spectral line is clearly visible, but it is surrounded by noise lines that dramatically reduce the signal to noise ratio (SNR). This means that we are able to reproduce the signal correctly, but we are not able to reproduce the Sigma-Delta noise. We can also see that by increasing the sequence length N (e.g., by doubling or quadrupling it), the SNR improves. For $f_c$=61.25 MHz and $f_s$=216 MHz, the minimum values for M and N are respectively 245 and 864. Instead of increasing the sequence length, the SNR can be improved with use of a randomizer, as described and discussed in the present disclosure. The randomizer randomizes the way the partial sequences are read from a respective memory or LUT, thus reducing the correlation among the partial sequences and lowering the passband noise. In the embodiment of FIG. 2, for $f_c$=61.25 MHz and $f_s$=216 MHz, the minimum random time interval measured in clock cycles (equivalent to the length of the shortest partial sequence) is an integer multiple of 864. In the embodiment of FIG. 3, for $f_c$=61.25 MHz and $f_s$=216 MHz, the minimum size of the memories is an integer multiple of 864.

Figure 4:
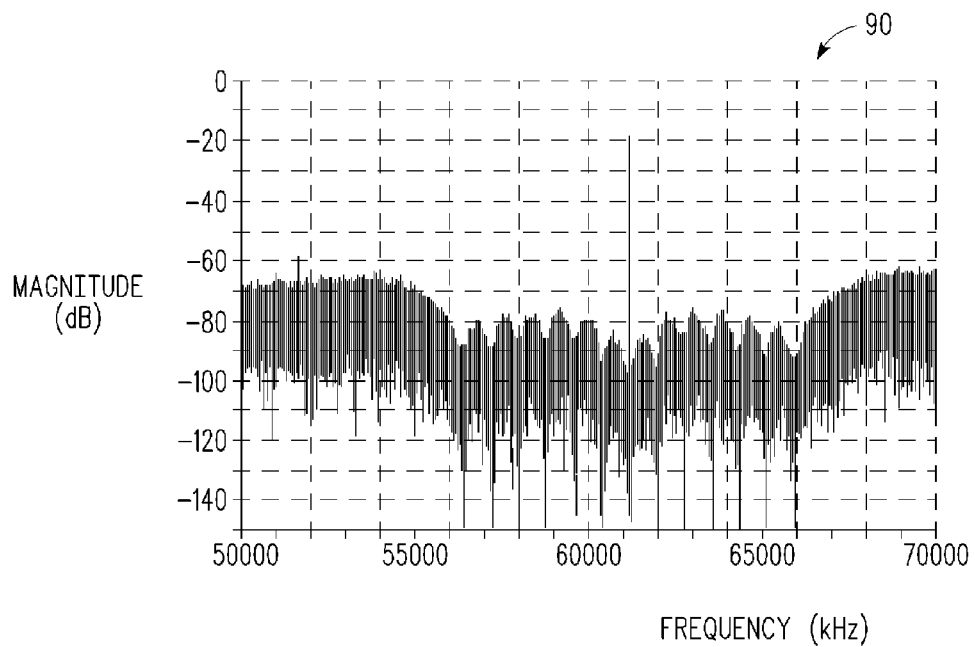
FIG. 4 is a graphical representation view of a passband spectrum of a $26^{th}$ order Sigma-Delta modulator with a 61.25 MHz sinusoidal input, corresponding to the carrier frequency of the TV channel 3.

FIG. 4 is a graphical representation view of a passband spectrum 90 of a $26^{th}$ order Sigma-Delta modulator with a 61.25 MHz sinusoidal input. As can be understood from the Figure, the carrier signal is corrupted by the quantization noise produced by the $26^{th}$ th order Sigma-Delta modulator. An analog filter is used to reject the out-of-band noise. For practical reasons the filter bandwidth cannot be too narrow. In other words, the filter can reject only noise outside the spectrum notch. The generator performance is determined mainly by the noise floor inside the notch, which depends on the noise shaping characteristic of the Sigma-Delta modulator. The $26^{th}$ order Sigma-Delta modulator has performance that is adequate for TV RF carriers. However, due to the hardware complexity, the modulator cannot run in real-time at 216 MHz. Furthermore, it is noted that output samples can be generated with computer simulations of a modulator model. The $26^{th}$ order Sigma-Delta modulator output spectrum constitutes a reference for establishing performance comparisons of the carrier generators based upon stored sequences of Sigma-Delta sequences.

Figure 5:
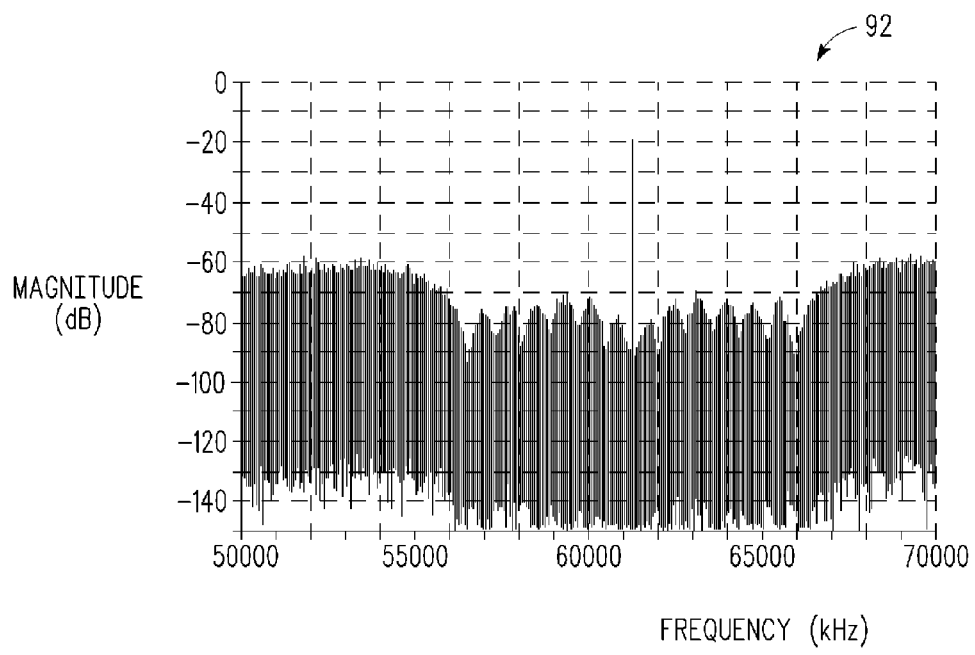
FIG. 5 is a graphical representation view of a passband spectrum of a prior art carrier generator, wherein the carrier generator included one read only memory (ROM) or look-up table that contained 138,240 samples.
Figure 6:
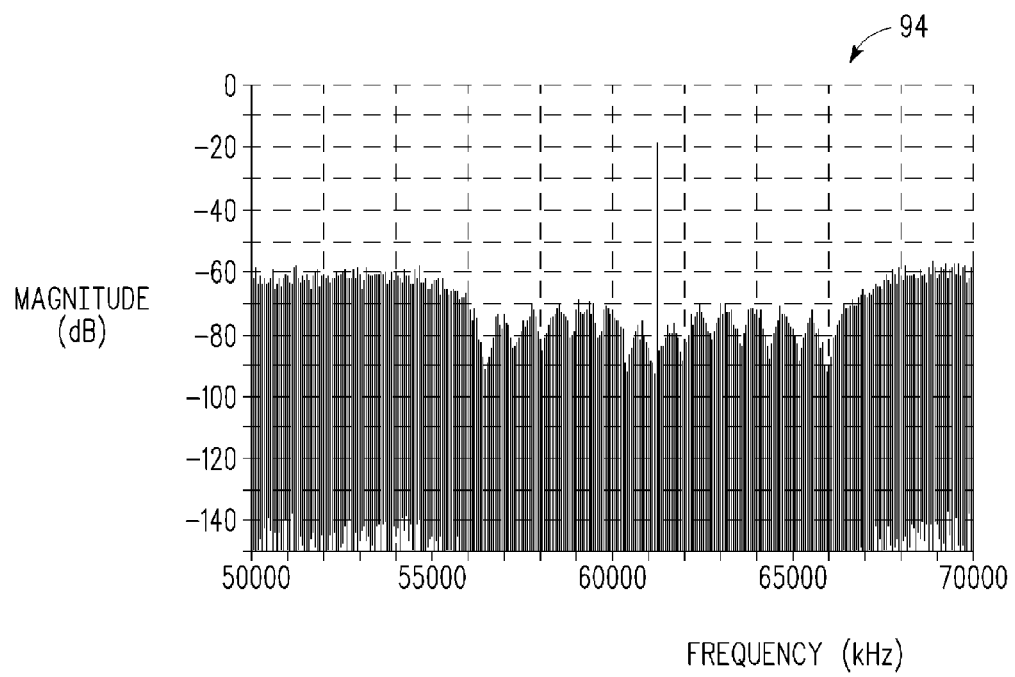
FIG. 6 is a graphical representation view of a passband spectrum of a prior art carrier generator, wherein the carrier generator included one ROM or look-up table that contained 69,120 samples.

Spectra of FIGS. 5 and 6 are generated by prior art generators, such as the carrier generator 10 of FIG. 1. A Sigma-Delta sequence of length N is stored into a memory or look-up table.

FIG. 5 is a graphical representation view of a passband spectrum 92 of a carrier generator, wherein the carrier generator includes one ROM or LUT that contained one-hundred and thirty eight thousand, two-hundred and forty (138,240) samples. In particular, the ROM or LUT contains (1×138240) 1-bit samples.

FIG. 6 is a graphical representation view of a passband spectrum 94 of a carrier generator, wherein the carrier generator includes one ROM or LUT that contained sixty-nine thousand, one hundred and twenty (69,120) samples. In particular, the ROM or LUT contained (1×69120) 1-bit samples.

It can be noted that with N=69120 (FIG. 6), the passband noise spectrum is higher than the one of the Sigma-Delta model of FIG. 4 and it is still higher, even by doubling the sequence length, as shown in FIG. 5. Even though the carrier signal is reproduced correctly, correlation between the repeated sequences produces spurs which increase the passband noise floor, thus producing a degraded performance.

Figure 7:
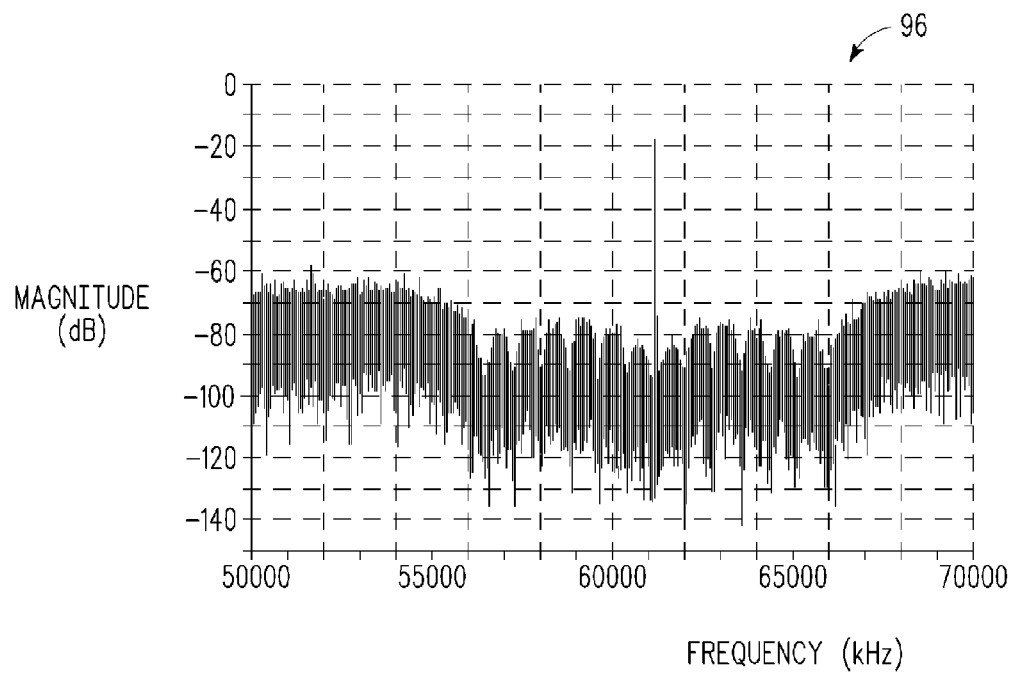
FIG. 7 is a graphical representation view of a passband spectrum of a carrier generator according to one embodiment of the present disclosure, wherein the carrier generator includes a bit stream randomizer and sixteen (16) ROMs or look-up tables that contain 8,640 samples each.

FIG. 7 is a graphical representation view of a passband spectrum 96 of a carrier generator according to one embodiment of the present disclosure, wherein the carrier generator included sixteen (16) ROMs or LUTs that contain eight-thousand, six hundred and forty (8,640) samples each. In particular, each ROM or LUT contains (1×8640) 1-bit samples. The noise floor (in FIG. 7) is substantially similar to the one of the Sigma-Delta model spectrum of FIG. 4. The randomizer reduces the correlations between sequences, thus lowering the noise floor and allowing the achievement of a performance similar to the one of the model. It must be noted that, while the Sigma-Delta model can only be simulated, the generator with randomizer can really be implemented with digital circuitry running at 216 MHz, according to the embodiments of the present disclosure. Also, it can be noted that the generator with randomizer used for FIG. 7 has better performance than the prior art generator used for FIG. 5, even though they use the same number of samples. In fact, the carrier generator used to generate the spectra of FIG. 7 has a total of 16×8640=138240 samples as does the carrier generator used in generation of the spectrum of FIG. 5.

Figure 8:
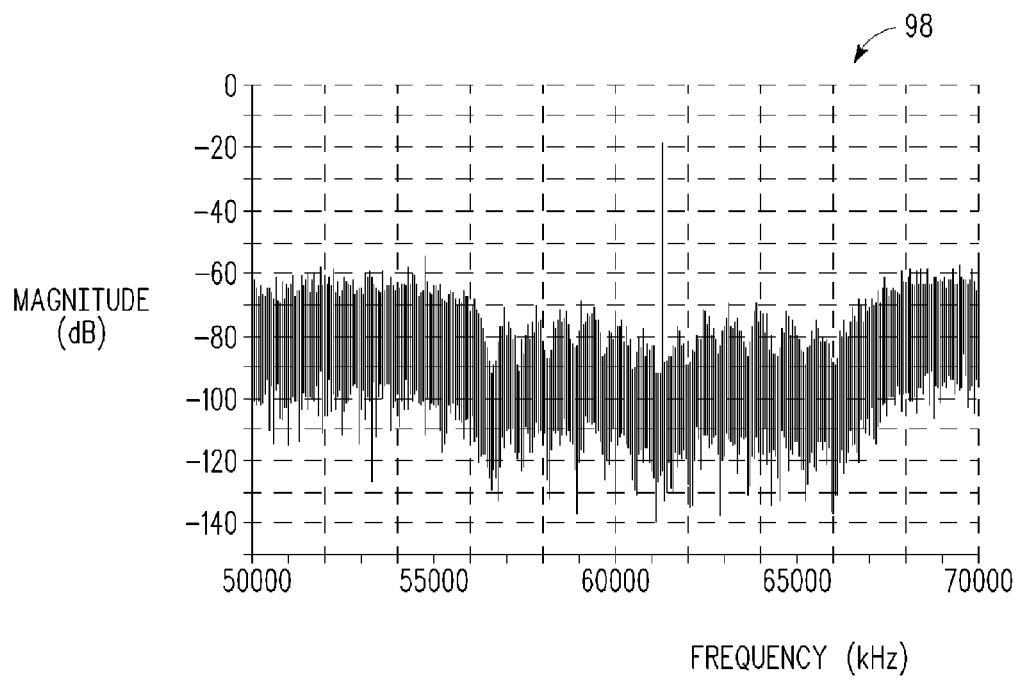
FIG. 8 is a graphical representation view of a passband spectrum of a carrier generator according to one embodiment of the present disclosure, wherein the carrier generator includes a bit stream randomizer and eight (8) ROMs or look-up tables that contain 8,640 samples each.

FIG. 8 is a graphical representation view of a passband spectrum 98 of a carrier generator according to one embodiment of the present disclosure, wherein the carrier generator included eight (8) ROMs or LUTs that contain eight-thousand, six hundred and forty (8,640) samples each. In particular, each ROM or LUT contains (1×8640) 1-bit samples. The carrier generator used to produce the spectrum of FIG. 8 is similar to the one used for FIG. 7; however, the only difference is that instead of using sixteen (16) ROMs or LUTs, the carrier generator for producing the spectrum of FIG. 8 uses only eight (8) ROMs or LUTs. The noise floor of FIG. 8 is increased compared to that of FIG. 7 and it is comparable to the spectrum of FIG. 5. It can be further noted that while the carrier generator used to produce the spectrum of FIG. 8 has a performance equivalent to that of the prior art generator used for producing the spectrum of FIG. 5, the carrier generator used to produce the spectrum of FIG. 8 advantageously uses only 8×8640=69120 samples (i.e., half the samples of prior art generator).

Figure 9:
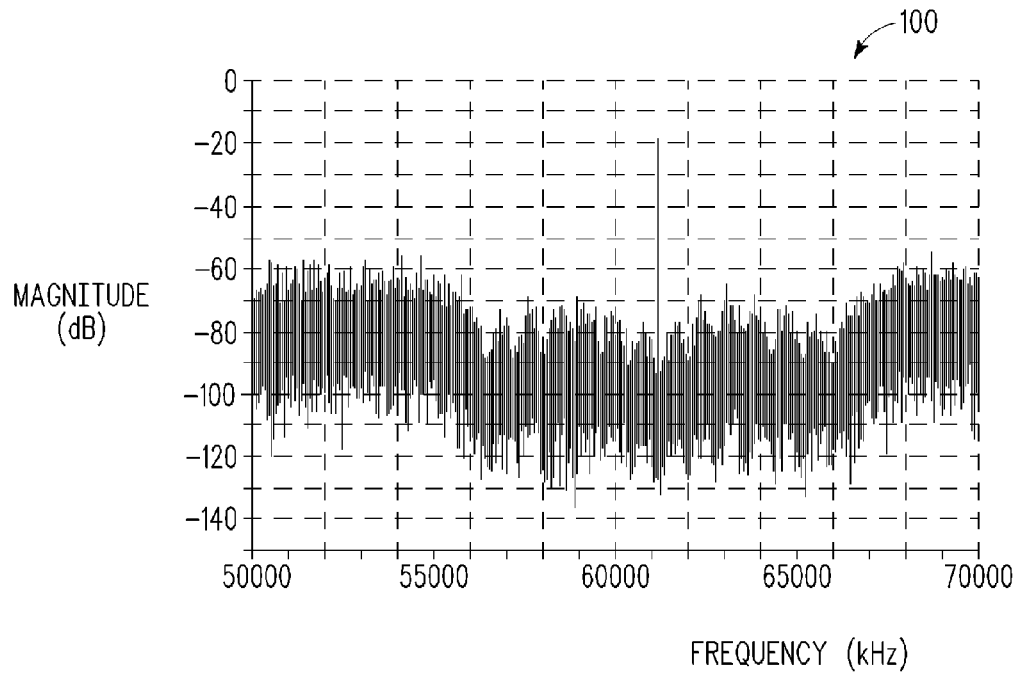
FIG. 9 is a graphical representation view of a passband spectrum of a carrier generator according to one embodiment of the present disclosure, wherein the carrier generator includes a bit stream randomizer and eight (8) ROMs or look-up tables that contain 4,320 samples each.

FIG. 9 is a graphical representation view of a passband spectrum 100 of a carrier generator according to one embodiment of the present disclosure, wherein the carrier generator included eight (8) ROMs or LUTs that contained four thousand, three hundred and twenty (4,320) samples each. In particular, each ROM or LUT contains (1×4320) 1-bit samples. The carrier generator used to produce the spectrum of FIG. 9 is similar to the one used for FIG. 8; however, the only difference is that its ROMs or LUTs contain 4320 samples instead of 8640. It can be noted that while the carrier generator used to produce the spectrum of FIG. 9 has a performance equivalent to that of the prior art generator used for producing the spectrum of FIG. 6, the carrier generator that produced the spectrum of FIG. 9 advantageously uses only 8×4320=34560 samples (i.e., half the samples of prior art generator).

Figure 10:
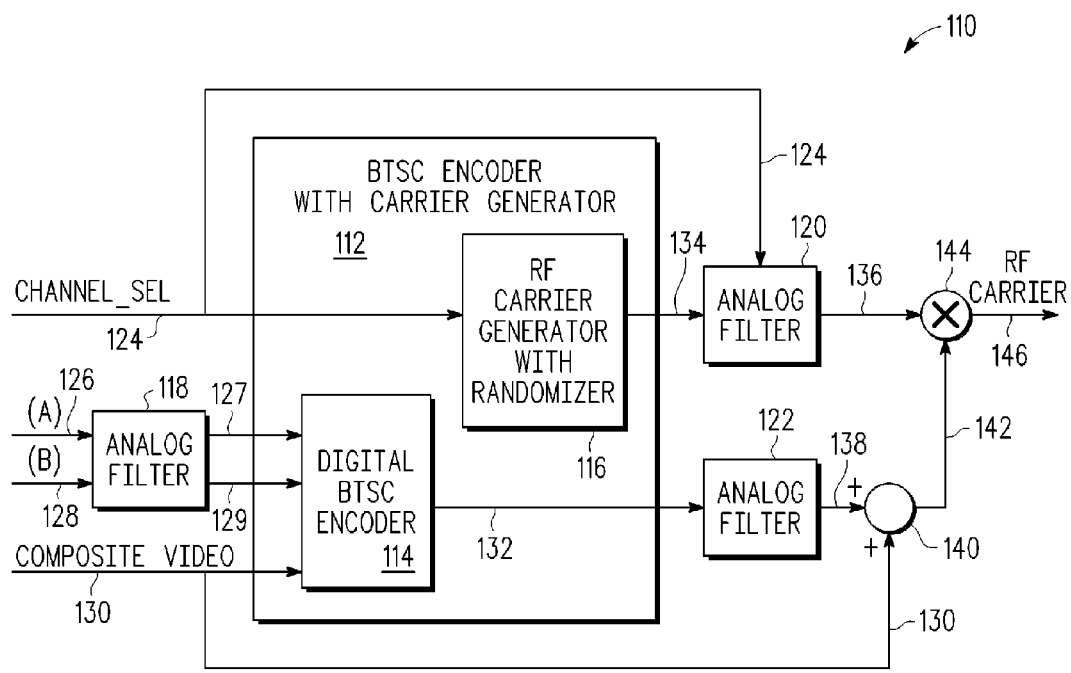
FIG. 10 is a block diagram representation view of a BTSC system with a Sigma-Delta carrier generator according to one embodiment of the present disclosure.

FIG. 10 is a block diagram representation view of a BTSC system 110 with a Sigma-Delta carrier generator according to one embodiment of the present disclosure. BTSC system 110 comprises a BTSC encoder with carrier generator 112, wherein the BTSC encoder with carrier generator 112 includes a digital BTSC encoder 114 and a Sigma-Delta carrier generator with randomizer 116. Digital BTSC encoder 114 can comprise any suitable digital BTSC encoder combined with an FM modulator. In one embodiment, digital BTSC encoder 114 comprises a digital BTSC encoder as described in co-pending patent application Ser. No. 11/060,993 entitled "BTSC Encoding Method With Digital FM Modulation" to Zoso et al. and Ser. No. 11/061,155 entitled "BTSC Encoder With Digital FM Modulator Feature" to Zoso et al., both filed on Feb. 18, 2005. Sigma-Delta carrier generator with randomizer 116 comprises a Sigma-Delta carrier generator with randomizer 32 or 62, as discussed herein with respect to FIGS. 2 and 3, respectively.

System 110 further comprises an input analog filter 118 and output analog filters 120 and 122. System 110 receives a channel select input (Channel_Sel) on signal line 124. In one embodiment, the channel select input represents a signal for selecting between VHF channel 3 (Ch3) or channel 4 (Ch4). Analog filter 118 receives Left and Right channel audio inputs 126 and 128, respectively. While inputs 126 and 128 are described with respect to Left and Right channel audio inputs, the same may also represent any dual channel input, such as an A-channel and a B-channel input. Analog filter 118 provides filtered Left and Right channel audio input signals on signal outputs 127 and 129, respectively. The signal outputs 127 and 129 are input to digital BTSC encoder 114, in addition to a composite video input 130. Responsive to filtered Left and Right channel input signals on signal lines 127 and 129, respectively, and responsive to a composite video signal on signal line 130, digital BTSC encoder 114 outputs an FM modulated composite audio signal on signal line 132. Signal line 132 also represents an input signal line to analog filter 122, as will be discussed further herein.

Responsive to a channel select signal on Channel_Sel line 124, the Sigma-Delta carrier generator with randomizer 116 provides a corresponding output carrier bit stream on signal line 134, as previously discussed with respect to generators 32 and 62 of FIGS. 2 and 3, respectively. The output carrier bit stream of generator 116 on signal line 134 is input to analog filter 120. Analog filter 120 also receives a channel select signal on signal line 124 as an input. Responsive to the carrier generator bit stream on signal line 134 and the channel select on signal line 124, analog filter 120 provides a filtered signal on signal line 136.

Referring again to analog filter 122, responsive to the FM modulated composite audio signal on signal line 132, analog filter 122 provides a filtered signal on signal line 138. The filtered signal on signal line 138 is input to a summing junction 140, in addition to the composite video on signal line 130. The summing junction 140 outputs a summed signal on output signal line 142, representative of the summation of an analog filtered, FM modulated composite audio signal and a composite video signal.

In addition, the filtered signal on signal line 136 and the signal on signal line 142 are input to a multiplier junction 144. Multiplier junction 144 outputs a signal corresponding to an RF modulated signal on output signal line 146. Traditional BTSC systems use RF modulators implemented in a different integrated circuit to modulate the FM modulated composite audio 132 and composite video 130 onto a channel 3/channel 4 carrier. The Sigma-Delta carrier generator with randomizer can be integrated with the BTSC encoder. Furthermore, only a few external components are needed to combine the FM modulated composite audio with the composite video and to perform the RF modulation of the combined signal. This allows for reducing the cost of the overall system.

Prior methods to solve the problem addressed by the embodiments of the present disclosure suggest that one keeps increasing the sequence duration and explores the bit stream with some optimization technique in search for a sequence which optimizes the SNR. This sequence is then stored into the memory or look-up table. However these optimization techniques look effective only with small values of N and when the SNR is still far from the one obtained with computer simulations of the modulator model.

The embodiments of the present disclosure address a different approach to reduce the noise floor. The embodiments include a method of randomizing the way the bit stream is output. If a sequence of N samples is repeatedly output, the signal spectral line is reproduced correctly, but at the same time a correlation is introduced among the repeated sequences. In other words, the noise is not as random as in the Sigma-Delta modulator model output. Correlation among the repeated sequences translates into noise spurs around the signal spectral line which strongly affect the SNR. According to the embodiments of the present disclosure, this correlation can be reduced by randomizing (i) the duration of partial sequences derived from the original N-sample sequence and (ii) the order with which they are output, thus lowering the in-band noise.

In the embodiments of the present disclosure, the Sigma-Delta samples are stored in a single look-up table or multiple look-up tables (FIGS. 2 and 3). From the viewpoint of implementation and circuit speed, it might be more efficient to store a bit stream in multiple look-up tables instead of a very long one. The address is computed by adding the counter output to an offset produced by a randomizer. The offset is changed at random intervals. When the offset is constant, the samples are output sequentially as they were stored in the look-up tables. Whenever the randomizer generates a new offset, a number of samples equivalent to the offset are skipped before resuming the sequential reading. In this way, sequences of variable duration and starting point can be output. In addition to generating the offset, the randomizer also determines the duration of each partial sequence. Table lengths, offset and time interval must contain an integer number of carrier periods in order to comply with the criterion of Equation 3. Furthermore, a wrap-around mechanism prevents the addresses from going outside the table look-up range.

According to one embodiment of the present disclosure, a method of generating an RF carrier comprises storing sequential sequences of Sigma-Delta samples in a number of look-up tables of the same size. The look-up table length is chosen in such a way as to contain an integer number of carrier periods. While the contents of each look-up table are output sequentially, the order with which the look-up tables are selected is random, as decided by the randomizer. In such an embodiment, the randomizer provides an offset, wherein the offset is now used as a control signal to drive the multiplexer for selecting a desired one of the look-up tables. An implementation for a number (K) of look-up tables is shown in FIG. 3. The maximum carrier frequency which can be generated is limited only by the speed with which the look-up tables can be read.

As discussed herein, FIG. 8 shows the spectrum of a generator using eight (8) ROMs or look-up tables with 8640 samples each (equivalent to a total length of 69120). If we compare this spectrum with the one of a generator using a single look-up table with 69120 samples (shown in FIG. 6), we can notice that the performance of the generator with randomizer (FIG. 8) is better. Furthermore, the performance of the generator with randomizer (FIG. 8) is equivalent to the performance of a traditional generator with twice the number of samples (FIG. 5).

FIG. 9 shows the spectrum of a generator using eight (8) ROMs or look-up tables with 4320 samples each (equivalent to a total length of 34560). If we compare this spectrum with the one of a generator using a single look-up table with 69120 samples (shown in FIG. 6), we can notice that the performance of the generator with randomizer is equivalent to the performance of a traditional generator with twice the number of samples (FIG. 6). Similar comparisons are true also for the other spectra.

The spectrum of a generator with sixteen (16) ROMs or look-up tables of length 8640 (equivalent to a total length of 138240) is shown in FIG. 7. The performance is very close to the one of the modulator model (FIG. 4) and better than the one of prior art generator with the same sequence length shown in FIG. 5.

The RF generator with randomizer according to the embodiments of the present disclosure has either (i) a better performance compared to a traditional generator with the same number of samples stored in the memory or (ii) an equivalent performance compared to a traditional generator with twice the number of samples. In other words, at a parity of hardware complexity, a generator with randomizer offers improved performance compared to a traditional generator. Furthermore, at a parity of performance, a generator with randomizer has reduced hardware complexity compared to a traditional one.

While the embodiments have been described with respect to a channel 3 (61.25 MHz) carrier frequency, similar results can be obtained for the carrier of channel 4 (67.25 MHz). In another embodiment, the generator includes at least two sets of look-up tables to be able to generate either of the channel 3 or channel 4 frequency. Furthermore, in the latter embodiment, the output of the generator is filtered by an external bandpass LC filter 120 (FIG. 10), wherein the filter can comprise an inductor in parallel with a selectable capacitor configurable to reject the out-of-band noise for each respective carrier frequency.

As mentioned above, the block diagram of a BTSC encoder with a channel 3/channel 4 carrier generator is represented in FIG. 10. Traditional BTSC systems, besides a BTSC encoder, use a separate RF modulator to RF modulate the FM modulated composite audio and composite video onto a channel 3/channel 4 carrier. The generator with randomizer according to the embodiments of the present disclosure offers a more cost effective solution. In fact, in one embodiment the generator with randomizer (32, 62) can be integrated with the BTSC encoder into a single integrated circuit chip implementation. Also, only a few external components are needed to combine audio with video and to RF modulate the combined signal with the carrier produced by the Sigma-Delta carrier generator (32, 62). Accordingly, the need for a separate RF modulator is effectively eliminated. A similar approach, using an RF generator embodiment of the present disclosure, can also be used for NICAM systems. Furthermore, since the carrier frequency that can be generated is limited only by the speed with which the look-up tables can be read, the RF generator according to the embodiments of the present disclosure could be used to generate carriers with higher frequencies for TV, electronics and communications applications, or other suitable applications.

According to one embodiment, an RF carrier generator comprises a means for sequentially counting as a function of a randomized offset, and a memory coupled to the sequential counting means, the memory for storing samples of a desired Sigma-Delta modulator sequence bit stream, wherein responsive to an output of the sequential counting means, the memory sequentially outputs a single-bit output bit stream of a series of partial sequences of the desired Sigma-Delta modulator sequence bit stream. In one embodiment, the sequential counting means for sequentially counting comprises: a counter for sequentially counting on a counter output, and a randomizer for generating a randomizer output representative of the randomized offset and a random time interval representative of a partial sequence length, wherein the sequential counting means output is a function of the counter output and the randomizer output, wherein starting points and lengths of the partial sequences are a function of the randomized offset and the random time interval.

In one embodiment, the memory comprises at least one look-up table, read-only memory, random-access memory, digital memory, or other form of memory. In another embodiment, the sequential counting is representative of sequential addresses of a partial sequence stored in the memory. In another embodiment, the RF carrier generator further comprises a summing junction for summing the counter output and the randomizer output to produce a memory address for the memory, and further wherein the memory is responsive to the memory address obtained by adding the counter output to the randomizer output. In addition, according to yet another embodiment, the output of the memory changes from sequentially outputting a current partial sequence of the series of partial sequences to a subsequent partial sequence in response to a change in the randomizer output. In yet another embodiment wherein the randomizer output comprises a single-bit output, the RF carrier generator further comprises a serial-to-parallel converter for converting the single-bit output into a multi-bit output.

In a still further embodiment, the RF carrier generator further comprises a summing junction responsive to the counter output and the randomizer output for producing a summed output, the summed output representing a count of the counter offset by the randomizer output, and wherein the memory is responsive to the summed output for sequentially outputting the single-bit output bit stream. In this embodiment, the RF carrier generator further comprises a means for preventing memory addresses produced as a function of the counter output and the randomizer output from going outside a range of the memory.

In a further embodiment, the memory comprises a plurality of memories and wherein the plurality of memories are non-responsive to the randomizer output, said RF carrier generator further comprises a multiplexer coupled between outputs of the plurality of memories and an output of the RF carrier generator, wherein the randomizer generates a randomizer output representative of a randomized offset that is used as an input select of the multiplexer, wherein further the multiplexer is responsive to the randomizer output for selecting an output of a desired one of the plurality of memories.

In other embodiments, the samples of the desired Sigma-Delta sequence bit stream comprise pre-computed samples of an $N^{th}$ order Sigma-Delta modulator with a sinusoidal input, where N is an integer. In another embodiment, the RF carrier generator comprises a portion of a single integrated circuit chip implementation. Still further, in another embodiment, the desired Sigma-Delta modulator sequence bit stream is not sequentially read out in its entirety from a start to a finish of the entire Sigma-Delta modulator sequence bit stream.

According to another embodiment, an RF carrier generator comprises a means for sequentially counting as a function of a randomized offset, and a memory coupled to said sequential counting means, said memory for storing samples of a desired Sigma-Delta modulator sequence bit stream, wherein responsive to an output of the sequential counting means, the memory sequentially outputs a single-bit output bit stream of a series of partial sequences of the desired Sigma-Delta modulator sequence bit stream. The sequential counting means for sequentially counting comprises: a counter for sequentially counting on a counter output; and a randomizer for generating a randomizer output representative of the randomized offset and a random time interval representative of a partial sequence length, wherein the sequential counting means output is a function of the counter output and the randomizer output, wherein starting points and lengths of the partial sequences are a function of the randomized offset and the random time interval, wherein the output of the memory changes from sequentially outputting a current partial sequence of the series of partial sequences to a subsequent partial sequence in response to a change in the randomizer output, and wherein the desired Sigma-Delta modulator sequence bit stream is not sequentially read out in its entirety from a start to a finish of the entire Sigma-Delta modulator sequence bit stream.

According to yet another embodiment, a method of generating an RF carrier comprises storing samples of a desired Sigma-Delta modulator sequence bit stream in a memory; sequentially counting as a function of a randomized offset; and coupling the sequential counting to the memory, wherein responsive to the sequential counting, the memory sequentially outputs a single-bit output bit stream of a series of partial sequences of the desired Sigma-Delta modulator sequence bit stream. In one embodiment, the sequential counting comprises: sequentially counting on a counter output; and generating a randomizer output representative of the randomized offset and a random time interval representative of a partial sequence length, wherein the sequential counting output is a function of the counter output and the randomizer output, wherein starting points and lengths of the partial sequences are a function of the randomized offset and the random time interval. In addition, the output of the memory changes from sequentially outputting a current partial sequence of the series of partial sequences to a subsequent partial sequence in response to a change in the randomizer output. In addition, the desired Sigma-Delta modulator sequence bit stream is not sequentially read out in its entirety from a start to a finish of the entire Sigma-Delta modulator sequence bit stream.

In another embodiment, the memory comprises a plurality of memories and wherein the plurality of memories are non-responsive to the randomizer output, the method further comprises: multiplexing between outputs of the plurality of memories and an output of the RF carrier generator, wherein the randomizer output is representative of a randomized offset that is used as an input select of the multiplexing, wherein further the multiplexing is responsive to the randomizer output for selecting an output of a desired one of the plurality of memories.

As discussed herein, in one embodiment, the RF generator includes a randomizer circuit for the generation of a randomizer output representative of the randomizer offset and for the generation of a random interval, corresponding to a partial sequence length. Such an embodiment is just one example, as there can be other ways to generate the offset and the interval. More importantly, the randomizer generates both (i) an offset and (ii) a time interval. For example, a random integer number can be derived by combining some bits of the offset. The randomizer generates the random number which is then multiplied times the minimum length of the partial sequences. The minimum length of the partial sequences is known by design based upon the sampling frequency and carrier frequency, for example, as discussed herein with respect to equation 1. Further in connection with combining some bits of the offset to derive a random integer number, it does not matter in which order the bits are selected from the offset or which bits are selected. Moreover, the random number could also be generated from other bits extracted from the randomizer.

Accordingly, in one embodiment, the randomizer provides an interval. The interval is of a given length, wherein the length is a function of (i) the minimum sequence length and (ii) a random number derived from the offset. In addition, the interval could also be derived in another way from the randomizer, according to another embodiment. Furthermore, in the embodiments discussed herein, the counter can comprise any suitable counter that wraps around. Also, a wrap-around can be performed on the summing junction to make sure that the addresses are correct.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments. For example, one embodiment of the present disclosure includes stereophonic audio encoders used for audio/video consumer electronics. In addition, the embodiments of the present disclosure may be used as a generator for built-in self test applications with higher performance or lower complexity, as compared to prior art generators.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An RF carrier generator comprising:
   a means for sequentially counting as a function of a randomized offset; and
   a memory coupled to said sequential counting means, said memory for storing samples of a desired Sigma-Delta modulator sequence bit stream, wherein responsive to an output of the sequential counting means, the memory sequentially outputs a single-bit output bit stream of a series of partial sequences of the desired Sigma-Delta modulator sequence bit stream,
   wherein the sequential counting means for sequentially counting comprises:
      a counter for sequentially counting on a counter output; and a randomizer for generating a randomizer output representative of the randomized offset and a random time interval representative of a partial sequence length, wherein the sequential counting means output is a function of the counter output and the randomizer output, wherein starting points and lengths of the partial sequences are a function of the randomized offset and the random time interval.

2. The RF carrier generator of claim 1, wherein the memory comprises at least one look-up table, read-only memory, random-access memory, digital memory, or other form of memory.

3. The RF carrier generator of claim 1, wherein the sequential counting is representative of sequential addresses of a partial sequence stored in the memory.

4. The RF carrier generator of claim 1, further comprising:
a summing junction for summing the counter output and the randomizer output to produce a memory address for the memory, and further wherein the memory is responsive to the memory address obtained by adding the counter output to the randomizer output.

5. The RF carrier generator of claim 1, wherein the output of the memory changes from sequentially outputting a current partial sequence of the series of partial sequences to a subsequent partial sequence in response to a change in the randomizer output.

6. The RF carrier generator of claim 1, wherein the randomizer output comprises a single-bit output, said RF carrier generator further comprising:
a serial-to-parallel converter for converting the single-bit output into a multi-bit output.

7. The RF carrier generator of claim 1, further comprising:
a summing junction responsive to the counter output and the randomizer output for producing a summed output, the summed output representing a count of the counter offset by the randomizer output, and wherein the memory is responsive to the summed output for sequentially outputting the single-bit output bit stream.

8. The RF carrier generator of claim 7, further comprising:
means for preventing memory addresses produced as a function of the counter output and the randomizer output from going outside a range of the memory.

9. The RF carrier generator of claim 1, wherein the memory comprises a plurality of memories and wherein the plurality of memories are non-responsive to the randomizer output, said RF carrier generator further comprising:
a multiplexer coupled between outputs of the plurality of memories and an output of the RF carrier generator, wherein the randomizer generates a randomizer output representative of a randomized offset that is used as an input select of the multiplexer, wherein further the multiplexer is responsive to the randomizer output for selecting an output of a desired one of the plurality of memories.

10. The RF carrier generator of claim 1, wherein the samples of the desired Sigma-Delta sequence bit stream comprise pre-computed samples of an $N^{th}$ order Sigma-Delta modulator with a sinusoidal input, where N is an integer.

11. The RF carrier generator of claim 1, further comprising:
an analog filter for filtering the single-bit output bit stream signal.

12. The RF carrier generator of claim 1, wherein said RF carrier generator is a portion of a single integrated circuit chip implementation.

13. The RF carrier generator of claim 1, wherein the desired Sigma-Delta modulator sequence bit stream is not sequentially read out in its entirety from a start to a finish of the entire Sigma-Delta modulator sequence bit stream.

14. An RF carrier generator comprising:
a means for sequentially counting as a function of a randomized offset; and
a memory coupled to said sequential counting means, said memory for storing samples of a desired Sigma-Delta modulator sequence bit stream, wherein responsive to an output of the sequential counting means, the memory sequentially outputs a single-bit output bit stream of a series of partial sequences of the desired Sigma-Delta modulator sequence bit stream, wherein the sequential counting means for sequentially counting comprises:
a counter for sequentially counting on a counter output; and
a randomizer for generating a randomizer output representative of the randomized offset and a random time interval representative of a partial sequence length, wherein the sequential counting means output is a function of the counter output and the randomizer output, wherein starting points and lengths of the partial sequences are a function of the randomized offset and the random time interval, wherein the output of the memory changes from sequentially outputting a current partial sequence of the series of partial sequences to a subsequent partial sequence in response to a change in the randomizer output, and wherein the desired Sigma-Delta modulator sequence bit stream is not sequentially read out in its entirety from a start to a finish of the entire Sigma-Delta modulator sequence bit stream.

15. A method of generating an RF carrier comprising:
storing samples of a desired Sigma-Delta modulator sequence bit stream in a memory;
sequentially counting as a function of a randomized offset; and
coupling the sequential counting to the memory, wherein responsive to the sequential counting,
the memory sequentially outputs a single-bit output bit stream of a series of partial sequences of the desired Sigma-Delta modulator sequence bit stream,
wherein the sequential counting comprises:
sequentially counting on a counter output; and
generating a randomizer output representative of the randomized offset and a random time interval representative of a partial sequence length, wherein the sequential counting output is a function of the counter output and the randomizer output, wherein starting points and lengths of the partial sequences are a function of the randomized offset and the random time interval.

16. The method of claim 15, wherein the output of the memory changes from sequentially outputting a current partial sequence of the series of partial sequences to a subsequent partial sequence in response to a change in the randomizer output.

17. The method of claim 15, wherein the memory comprises a plurality of memories and wherein the plurality of memories are non-responsive to the randomizer output, said method further comprising:
multiplexing between outputs of the plurality of memories and an output of the RF carrier generator, wherein the randomizer output is representative of a randomized offset that is used as an input select of the multiplexing, wherein further the multiplexing is responsive to the randomizer output for selecting an output of a desired one of the plurality of memories.

18. The method of claim 15, wherein the desired Sigma-Delta modulator sequence bit stream is not sequentially read out in its entirety from a start to a finish of the entire Sigma-Delta modulator sequence bit stream.

* * * * *